United States Patent
Findlay

(10) Patent No.: US 8,102,989 B1
(45) Date of Patent: Jan. 24, 2012

(54) APPARATUS AND METHOD FOR SWITCHING FROM OVERLAP SIGNALING TO EN BLOC SIGNALING IN A DATA NETWORK

(75) Inventor: L. Patrick Findlay, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 1897 days.

(21) Appl. No.: 11/204,710

(22) Filed: Aug. 16, 2005

(51) Int. Cl.
*H04M 7/00* (2006.01)

(52) U.S. Cl. ........ 379/229; 379/219; 379/230; 379/237; 370/464; 370/465; 370/466; 370/467

(58) Field of Classification Search .................. 379/230, 379/219, 229, 237; 370/464, 465, 466, 467
See application file for complete search history.

(56) References Cited

U.S. PATENT DOCUMENTS

| | | | |
|---|---|---|---|
| 6,111,893 A * | 8/2000 | Volftsun et al. | 370/466 |
| 6,778,658 B1 * | 8/2004 | McDonald et al. | 379/230 |
| 2001/0036159 A1 * | 11/2001 | Katz et al. | 370/241 |
| 2003/0007483 A1 * | 1/2003 | Um | 370/352 |

* cited by examiner

*Primary Examiner* — Ahmad Matar
*Assistant Examiner* — Khai N Nguyen
(74) *Attorney, Agent, or Firm* — Withrow & Terranova, PLLC

(57) ABSTRACT

Gateways facilitate communication of voice traffic from a calling party to a called party over a packet network. To establish a communication session, an originating gateway sends one or more initial call control messages using overlap signaling to a destination gateway. The destination gateway may be unable to establish the communication session using overlap signaling. The destination gateway signals the originating gateway, such as by indicating that the communication session could not be established because of an incomplete or invalid destination address. The originating gateway then attempts to establish the communication session using en bloc signaling. In this way, an attempt that fails due to the use of overlap signaling is retried using en bloc signaling.

20 Claims, 5 Drawing Sheets

APPARATUS AND METHOD FOR SWITCHING FROM OVERLAP SIGNALING TO EN BLOC SIGNALING IN A DATA NETWORK

TECHNICAL FIELD

This disclosure relates generally to communication systems and more specifically to an apparatus and method for switching from overlap signaling to en bloc signaling in a data network.

BACKGROUND

The use of packet data networks to transport voice information is becoming increasingly popular in the United States and around the world. For example, many service providers offer customers telephone and other voice services, where voice information is digitized and transported over data networks. However, different manufacturers of network equipment and different service providers often use different procedures or protocols to establish and provide the voice services.

As an example of different procedures or protocols, voice services are often established using "en bloc dialing" or "overlap dialing." In en bloc dialing, all addressing information (such as all of the digits in a telephone or directory number) is contained in a single call control signaling message, and no further address information is transmitted in subsequent signaling messages. In overlap dialing, addressing information may be contained in multiple signaling messages. En bloc dialing is also known as "en bloc signaling," and overlap dialing is also known as "overlap signaling." Also, addressing information (such as a telephone or directory number) is said to represent a "destination address."

Overlap dialing may provide several advantages over en bloc dialing. For example, overlap dialing may be better suited for use in countries that use destination addresses having different lengths. Without overlap dialing, devices that make routing decisions in a network would need to support a full network address routing table, which is inefficient and impractical. With overlap dialing, a call may be routed more efficiently (such as by using only the prefix of a dialed telephone number), and another network (such as a public switched telephone network) may complete the routing decisions.

A problem in conventional data networks is that some network components (such as specific makes or types of gateways) do not support overlap dialing. For example, a given gateway that maps voice information from a Time Division Multiplexing (TDM) format to a Voice over Internet Protocol (VoIP) format may support only en bloc dialing. Similar gateways could support either overlap dialing or en bloc dialing depending on provisioning. A call that actually uses overlap signaling may not have the full destination address in its initial message, while a call using en bloc dialing needs to have the full destination address in its initial message. If a call originates at a gateway that uses overlap signaling and terminates at a gateway supporting only en bloc signaling, the call may be rejected as having an "incomplete" or "invalid" destination address. Furthermore, some countries specifically require that their public communication networks use only en bloc signaling or only overlap signaling. This may create problems, for example, when a gateway in an overlap signaling jurisdiction attempts to set up a communication session involving a gateway in an en bloc signaling jurisdiction.

In various prior systems, some sort of "retry" mechanism is invoked if a call fails for this reason. For example, the party that placed the rejected call could be redirected to a human operator for intervention or to a man-machine interface such as an automated attendant. The automated attendant typically prompted the party to redial the entire destination address or provided recorded instructions explaining how the party should hang up and redial the destination address.

SUMMARY

This disclosure provides an apparatus and method for switching from overlap signaling to en bloc signaling in a data network.

In one embodiment, a method includes transmitting a first message for establishing a communication session using overlap signaling. The first message includes only a portion of a destination address. The method also includes detecting a trigger indicating that overlap signaling cannot be used to establish the communication session. The method further includes collecting an additional portion of the destination address. In addition, the method includes transmitting a second message for establishing the communication session using en bloc signaling. The second message includes an entire destination address.

In particular embodiments, detecting the trigger includes (i) detecting a message containing a specified code or parameter, and/or (ii) detecting a specified type of message.

In other particular embodiments, the additional portion of the destination address is collected without requiring a user to reenter the portion of the destination address contained in the first message.

Other technical features may be readily apparent to one skilled in the art from the following figures, descriptions, and claims.

BRIEF DESCRIPTION OF THE DRAWINGS

For a more complete understanding of this disclosure, reference is now made to the following description, in which.

DETAILED DESCRIPTION

Figure 1:
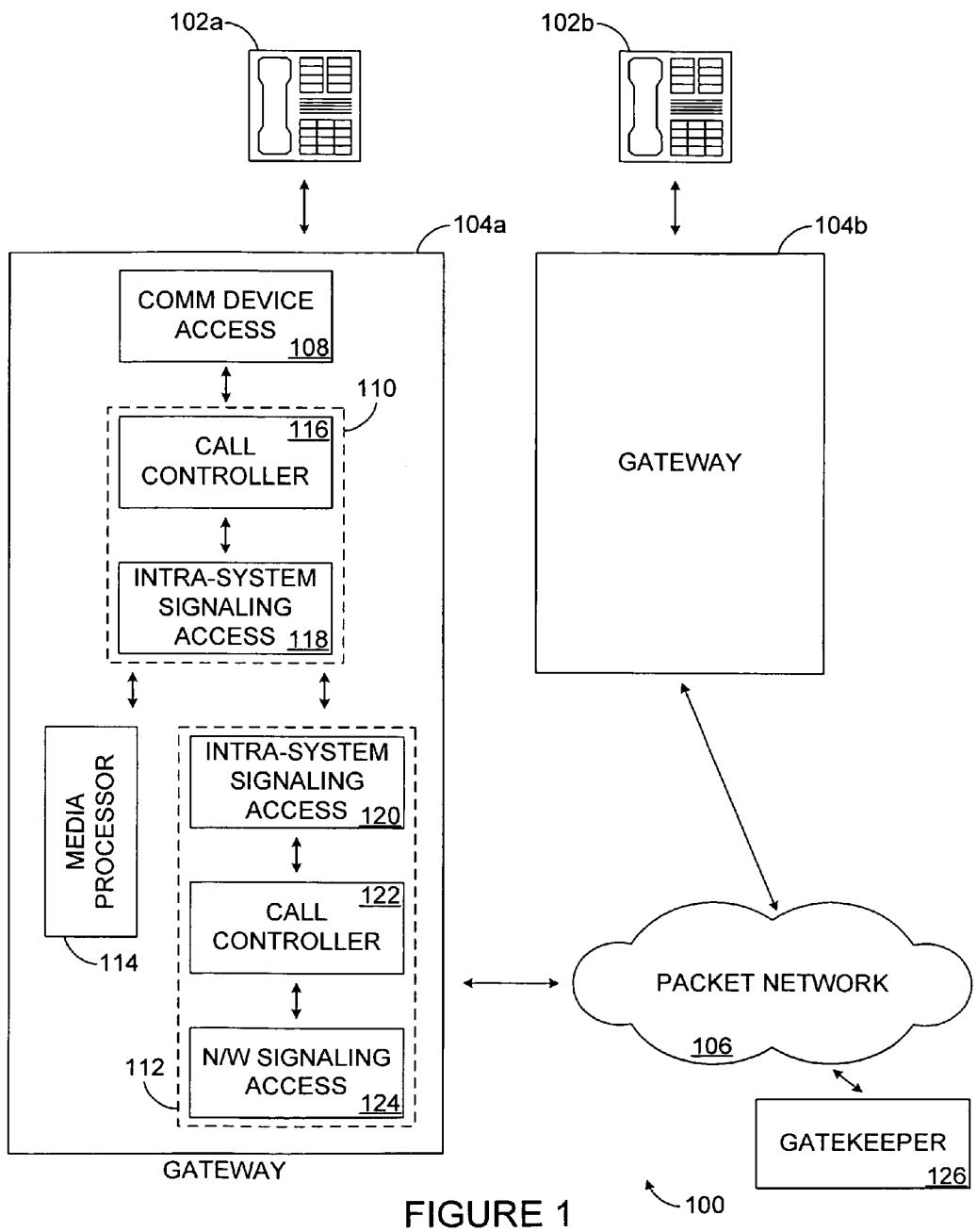
FIG. 1 illustrates an example system for switching from overlap signaling to en bloc signaling according to one embodiment of this disclosure.

FIG. 1 illustrates an example system 100 for switching from overlap signaling to en bloc signaling according to one embodiment of this disclosure. The embodiment of the system 100 shown in FIG. 1 is for illustration only. Other embodiments of the system 100 may be used without departing from the scope of this disclosure.

In this example, the system 100 includes communication devices 102a-102b, gateways 104a-104b, and a packet network 106.

The communication devices 102a-102b represent devices used by users or subscribers during communication sessions, or data conversions or conversations between devices or applications over a network. For example, each of the communication devices 102a-102b could represent an input/output device having a microphone and a speaker to capture and play audio information. Each of the communication devices 102a-102b could also include a camera and a display to capture and play video information. During a communication session (such as a telephone or videophone call or conference), the communication devices 102a-102b communicate with each other through the gateways 104a-104b and the network 106. In this way, the communication devices 102a-102b may exchange audio, video, graphical, or other information during a communication session. Each of the communication devices 102a-102b may be constructed or configured from any suitable hardware, software, firmware, or combination thereof for transmitting or receiving information over a network. As an example, the communication devices 102a-102b could represent telephones, videophones, computers, personal digital assistants, digital or analog trunks connected to one or more remote communication systems (where a remote system supports a call control function, trunking, and input/output devices), or other devices or systems supporting Time Division Multiplexing (TDM) or other voice services.

The gateways 104a-104b are coupled to the communication devices 102a-102b and the network 106. In this document, the term "couple" and its derivatives refer to any direct or indirect communication between two or more elements, whether or not those elements are in physical contact with one another. The gateways 104a-104b facilitate communication by the communication devices 102a-102b over the network 106. For example, the gateways 104a-104b could receive digital or analog audio data or signals from the communication devices 102a-102b, digitize analog audio data or signals (if necessary), and format the data or signals for transmission over the network 106. The gateways 104a-104b could also receive packet data over the network 106, convert digital audio data to analog data or signals (if necessary), and format the data or signals for transmission to the communication devices 102a-102b. In addition, the gateways 104a-104b may exchange signaling messages used to establish and maintain voice services provided to the communication devices 102a-102b. As a particular example involving an Internet Protocol ("IP") network 106, the gateways 104a-104b could exchange audio data using the User Datagram Protocol (UDP) and exchange signaling messages using the Transmission Control Protocol (TCP). Each of the gateways 104a-104b may be constructed or configured from any suitable hardware, software, firmware, or combination thereof for facilitating communication by communication devices over a network. As an example, a gateway may include a device or system used to convert between signaling and/or voice-band data from a format used on one transmission medium to a format used on another transmission medium. Names for these types of devices or systems may vary based on the protocol, and the term "gateway" includes components such as gateways, media gateways, signaling gateways, end points, and others.

The network 106 is coupled to the gateways 104a-104b. The network 106 facilitates communication between components of the system 100. For example, the network 106 may communicate IP packets, frame relay frames, Asynchronous Transfer Mode ("ATM") cells, or other suitable information between network addresses or devices. The network 106 could also carry one form of packet data within another form, such as by carrying IP packets using ATM cells. The network 106 may include one or more local area networks ("LANs"), metropolitan area networks ("MANs"), wide area networks ("WANs"), all or portions of a global network such as the Internet, or any other communication system or systems at one or more locations. As an example, the network 106 could include various servers, routers, bridges, and other access and backbone devices.

Various components in the system 100 may use any suitable protocol or protocols to provide voice services to users of the communication devices 102a-102b. For example, the gateways 104a-104b could support the International Telecommunication Union-Telecommunications (ITU-T) H.323 protocol, the ITU-T Q.2931 protocol, the Internet Engineering Task Force (IETF) Session Initiation Protocol (SIP), the IETF Media Gateway Control Protocol (MGCP), or any other suitable protocol or combination of protocols. In some embodiments, both of the gateways 104a-104b support at least one common protocol. In particular embodiments, the gateways 104a-104b have the ability to exchange additional information for services not defined in a protocol standard. As an example, the H.323 protocol includes a "User to User" Information Element (IE), which includes a "Non-Standard Data" section. As another example, the SIP protocol allows for the definition of new headers and body parts. In other embodiments, the gateways 104a-104b do not share a common protocol, and a protocol converter (such as a gatekeeper 126, which is described below) supports protocol translation for the gateways 104a-104b and may translate signaling messages sent between the gateways 104a-104b.

As shown in FIG. 1, the gateway 104a includes a communication device access interface 108, a call server 110, a signaling server 112, and a media processor 114. These components could represent logical entities (such as computer software entities) within a single hardware device, discrete physical devices, or a combination of the two.

The communication device access interface 108 provides an interface to one or more communication devices. For example, the communication device access interface 108 is operable to receive/transmit analog or digital audio data from/to the communication device 102a, such as analog audio data or audio data contained in a 56-kilobit per second or 64-kilobit per second data stream. The communication device access interface 108 also allows the gateway 104a and the communication device 102a to exchange call control signaling messages, such as TDM-based messages used to provide voice services to the communication device 102a. The call control signaling protocol used by the gateway 104a may (but need not) be the same call control signaling protocol used by the gateway 104b. The communication device access interface 108 may be constructed or configured from any suitable hardware, software, firmware, or combination thereof for facilitating analog or digital communication with a communication device. In some embodiments, the communication device access interface 108 represents a TDM access interface.

The call server 110 generally functions to control and support communication sessions that do not traverse the network 106 and anchors the local "half call" (the portion involving the communication device 102a) for sessions that traverse the network 106. For example, if a call does not traverse the network 106, the call server 110 provides and processes signaling messages required to establish communication sessions between two or more communication devices coupled to the gateway 104a. In this example, the call server 110 includes a call controller 116 for all sessions and an intra-system signaling access interface 118 for sessions that traverse the network 106. The call controller 116 is responsible for providing all call processing for communication sessions that do not traverse the network 106, such as by performing TDM-to-TDM call handling. The call controller 116 also provides call processing for the "half call" of a communication session traversing the network 106. The intra-system signaling access interface 118 represents an interface that allows the call server 110 to redirect signaling messages from the call controller 116 to the signaling server 112 (or to a backup signaling server) when a communication session traverses the network 106. The call controller 116 may be constructed or configured from any suitable hardware, software, firmware, or combination thereof for performing call processing. The intra-system signaling access interface 118 may be constructed or configured from any suitable hardware, software, firmware, or combination thereof for providing access to a signaling server.

The signaling server 112 generally functions to control and support communication sessions that traverse the network 106. For example, the signaling server 112 may convert between the signaling protocol used by the communication device 102a and the signaling protocol used by the gateway 104b. Also, as described in more detail below, the signaling server 112 allows a communication session initiated using overlap signaling to be established using en bloc signaling when required. This allows the gateway 104a to switch from overlap signaling to en bloc signaling when necessary. In this example, the signaling server 112 includes an intra-system signaling access interface 120, a call controller 122, and a network signaling access interface 124. The intra-system signaling access interface 120 represents an interface that allows the signaling server 112 to interact with the call server 110 (or with a backup call server) or with the communication device access interface 108 within the gateway 104a when a communication session traverses the network 106. The call controller 122 is responsible for providing call processing for these communication sessions, such as by performing IP-to-IP call handling and IP-to-TDM call handling and for switching over from overlap signaling to en bloc signaling when required. The network signaling access interface 124 represents an interface that allows the signaling server 112 to transmit and receive signaling messages over the network 106. The call controller 122 may be constructed or configured from any suitable hardware, software, firmware, or combination thereof for performing call processing. The intra-system signaling access interface 120 and the network signaling access interface 124 may each be constructed or configured from any suitable hardware, software, firmware, or combination thereof for providing access to a call server or a network, respectively.

The call server 110 and the signaling server 112 may use any suitable protocol or protocols to communicate with one another. For example, the call server 110 and the signaling server 112 could use an Integrated Services Digital Network (ISDN) based protocol. As a particular example, the ISDN protocol could allow the call server 110 and the signaling server 112 to exchange information related to feature and call control signaling transport and media capability transport, where Information Elements (IEs) are defined and used to transport information between the call server 110 and the signaling server 112. Other protocols could also be used, such as Digital Private Network Signaling System #1 (DPNSS1) when the call server 110 and signaling server 112 are discrete entities. Also, a less formal process such as direct message passing or data block pointer passing (or other means of passing data between two software entities) may be used, such as when the call server 110 and signaling server 112 are logical entities within the same physical device.

The media processor 114 performs audio data conversions so that the audio data may be transported between gateways. For example, audio data may be transported over the network 106 as either compressed or uncompressed 64-kilobit per second bit rate data within Real Time Protocol (RTP) media streams. The media processor 114 could convert audio data from the communication device 102a into a suitable RTP stream for communication over the network 106. The media processor 114 could also convert an RTP media stream into suitable data for the communication device 102a. The media processor 114 may be constructed or configured from any suitable hardware, software, firmware, or combination thereof for converting audio data between formats.

In this example, the system 100 also includes a gatekeeper 126. The gatekeeper 126 functions to control and manage the operations of the gateways 104a-104b. For example, the gatekeeper 126 could monitor and control which communication devices 102a-102b receive service from the gateways 104a-104b. Also, when the communication device 102a initiates a communication session for a destination (such as communication device 102b), the gatekeeper 126 could inform the gateway 104a of the network address of the gateway serving the destination (such as gateway 104b). The gatekeeper 126 may be constructed or configured from any suitable hardware, software, firmware, or combination thereof for facilitating interaction between gateways. As an example, a gatekeeper may include a device or system used to perform address resolution or provide call control message tandem. Names for this type of device or system may vary based on the protocol, and the term "gatekeeper" includes components such as "proxy servers", "redirect servers", "media gateway controllers", and other devices. In particular embodiments, the gatekeeper 126 is used when the system 100 supports particular protocols, such as the H.323 protocol. In other embodiments using other or additional protocols, the gatekeeper 126 could be supplemented or replaced with a different component, such as when the system 100 uses the SIP protocol and the gatekeeper 126 is replaced by SIP proxy and redirect servers. In yet other embodiments, where the gateways 104a-104b use different signaling protocols, the gatekeeper 126 may be able to provide translation between the different signaling types. Though shown as a separate element in FIG. 1, the gatekeeper 126 may be implemented within a gateway or in any other suitable manner.

As described in more detail below, in one aspect of operation, at least one of the gateways 104a-104b functions such that a communication session initiated using overlap signaling may be established using en bloc signaling, if desired. In this way, the use of human intervention may be eliminated when the use of overlap signaling fails. Also, the use of automated recordings prompting a user to completely reenter a telephone number or providing instructions to hang up and redial the telephone number may be eliminated or significantly reduced.

In some embodiments, the gateway 104a supports overlap signaling on both the "user side" of the gateway 104a (in the communication device access interface 108) and on the "packet network side" of the gateway 104a (in the signaling server 112). If the communication device 102a supports en bloc signaling but not overlap signaling, the gateway 104a may support en bloc signaling on its user side. In some embodiments, the gateway 104a may be unable at times to use overlap signaling even if it is supported by the gateway 104a, such as when the communication device 102a involved in a communication session does not support overlap signaling.

En bloc signaling may be a "minimum capability subset" of overlap signaling, so both gateways 104a-104b may support en bloc signaling on their packet network side. To support the switching from overlap signaling to en bloc signaling at the gateway 104a, one of the two interface points in the gateway 104b does not support overlap signaling. For example, the gateway 104b may be able to only use en bloc signaling over the network 106 and overlap signaling with the communication device 102b. Similarly, the gateway 104b may be able to only use overlap signaling over the network 106 and en bloc signaling with the communication device 102b.

The supported en bloc signaling protocols in the network 106 could include H.323, Q.2931, SIP, or other signaling protocol(s). The supported overlap signaling protocols in the network 106 could also include H.323, Q.2931, SIP (such as by supporting Request For Comment (RFC) 3578), or other signaling protocol(s). On the user side, the gateways 104a-104b may support user terminal digit generation (including pressing buttons on a keypad or clicking a mouse on active areas of a display). The gateways 104a-104b could further support trunk signaling on their user side, including Dual Tone Multi-Frequency (DTMF), Multi-Frequency Compelled (MFC), Dial Pulse, ISDN User-Network Interface, ISDN Peer to Peer Interface, DPNSS1, or other trunk signaling protocol(s). In some embodiments, the gateways 104a-104b use the same packet network voice signaling protocol, or a protocol converter (such as a hybrid/combined H.323 gatekeeper and SIP proxy server) is placed between the gateways 104a-104b.

Figure 2:
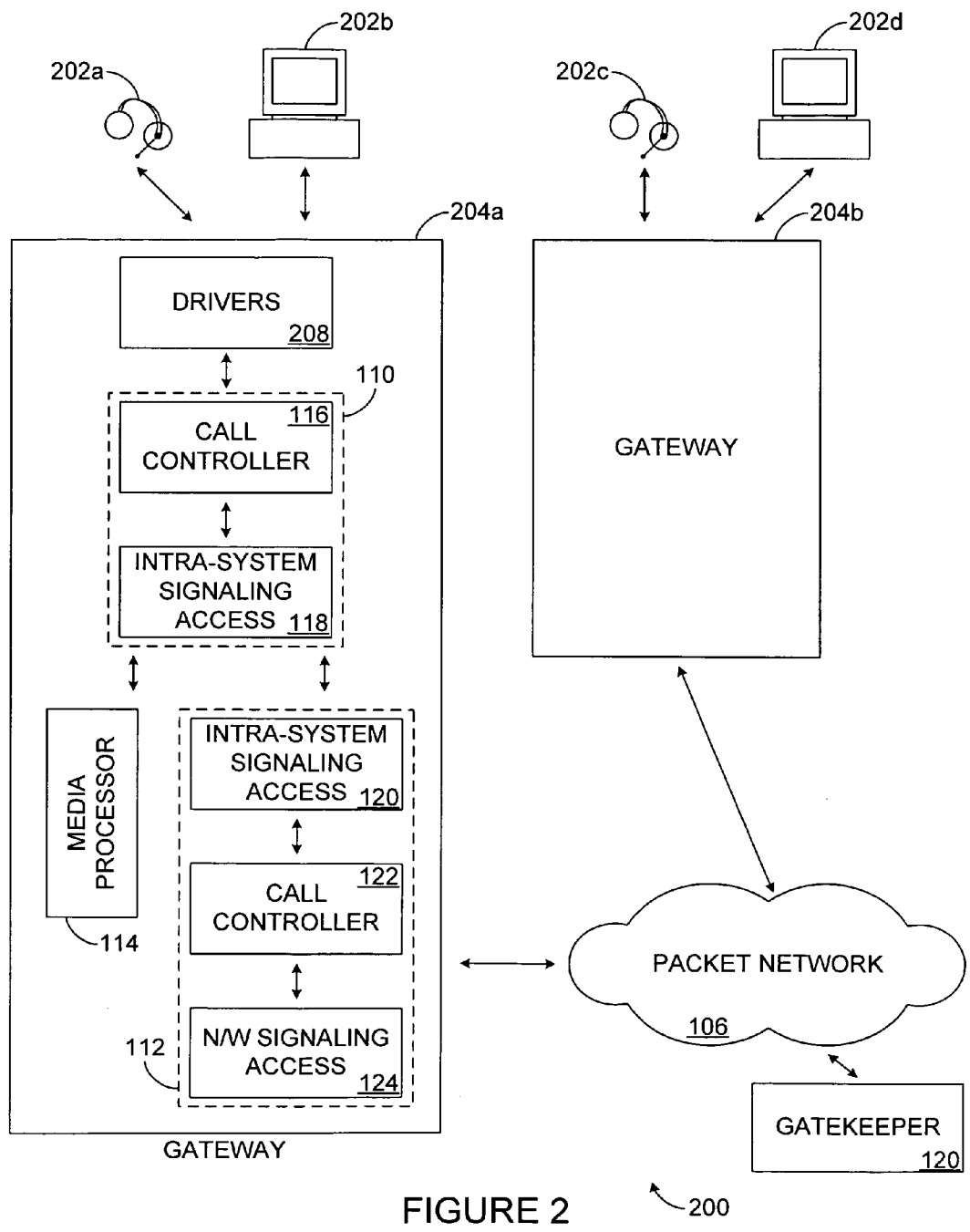
FIG. 2 illustrates another example system for switching from overlap signaling to en bloc signaling according to one embodiment of this disclosure.

FIG. 2 illustrates another example system 200 for switching from overlap signaling to en bloc signaling according to one embodiment of this disclosure. The embodiment of the system 200 shown in FIG. 2 is for illustration only. Other embodiments of the system 200 may be used without departing from the scope of this disclosure.

The system 200 shown in FIG. 2 is similar to the system 100 shown in FIG. 1. In this example, the system 200 includes different communication devices 202a-202d. Also, the communication device access interface 108 in the gateways 104a-104b of FIG. 1 have been replaced by one or more drivers 208 in the gateways 204a-204b of FIG. 2. The remaining components shown in FIG. 2 are the same as or similar to the components shown in FIG. 1 and will not be described further.

The communication devices 202a-202d in FIG. 2 represent devices that provide analog or digital audio data or signals or control signals to the gateways 204a-204b. As shown in FIG. 2, the communication devices 202a-202d could include audio transducers (devices 202a, 202c) that transmit and receive analog audio data and possibly video devices such as cameras and displays to capture and present video information. In this example, the audio transducers include microphones and speakers in headsets worn by users. The communication devices 202a-202d could also include input/output devices (devices 202b, 202d) that allow users to provide control data such as dialed telephone numbers to the gateways 204a-204b. For example, the devices 202b, 202d could represent desktop or other computers that include a keyboard, a mouse, and a monitor. In particular embodiments, the audio transducers (devices 202a, 202c) provide analog audio data or signals to the gateways 204a-204b. In other particular embodiments, the audio transducers (devices 202a, 202c) provide analog audio data or signals to the input/output devices (devices 202b, 202d), which digitize the data or signals for delivery to the gateways 204a-204b.

Data or signals from the communication devices 202a-202d are provided to the drivers 208 in the gateways 204a-204b. The drivers 208 perform various functions to support communication sessions in the system 200. For example, the drivers 208 could include input/output (I/O) and call control drivers. These drivers 208 could echo control data from the devices 202b, 202d back to the devices 202b, 202d for display to the users. These drivers 208 could also generate any TDM-based or other call control signaling messages needed to provide a requested voice service. As a particular example, the gateways 204a-204b in FIG. 2 could contain TDM functionality from the communication devices 102a-102b of FIG. 1. The drivers 208 may be constructed or configured from any suitable hardware, software, firmware, or combination thereof for supporting TDM-based or other signaling.

In one aspect of operation, at least one of the gateways 104a-104b in FIG. 1 or at least one of the gateways 204a-204b in FIG. 2 allows a communication session initiated using overlap signaling to be established using en bloc signaling. For example, the communication device 102a may initiate a telephone call or other communication session with the communication device 102b as the destination. In this example, the user using the communication device 102a is referred to as the "calling party," while the user of the communication device 102b is referred to as the "called party." Also, the gateway 104a serving the calling party is referred to as the "originating gateway," and the gateway 104b serving the called party is referred to as the "destination gateway." In some embodiments, the destination gateway 104b could have the same or similar structure as the originating gateway 104a. In other embodiments, the destination gateway 104b could include a communication device access interface (for communication with the communication device 102b), a call controller, and a network interface (for communication with the network 106) without the other components of the originating gateway 104a.

In accordance with one aspect of this disclosure, it is possible that the originating gateway 104a attempts to establish the requested call using overlap signaling, but the destination gateway 104b does not or cannot use overlap signaling. When this occurs, the originating gateway 104a detects the failure and attempts to establish the requested call using en bloc signaling. One example mechanism for performing this switch-over from overlap signaling to en bloc signaling is shown in FIG. 3.

This example is referenced repeatedly in the following description. While the following description uses this example, the same or similar functionality may be implemented in the gateways 204a-204b of FIG. 2. Also, this example uses a telephone call involving a telephone number that identifies the destination. The same or similar functionality may be used with any other type of communication session (such as a video call or other call that involves an audio session) and any other type of destination address information. Because of the wide familiarity with telephone calls and the underlying infrastructure, the telephone call makes an easily understandable example.

Figure 3:
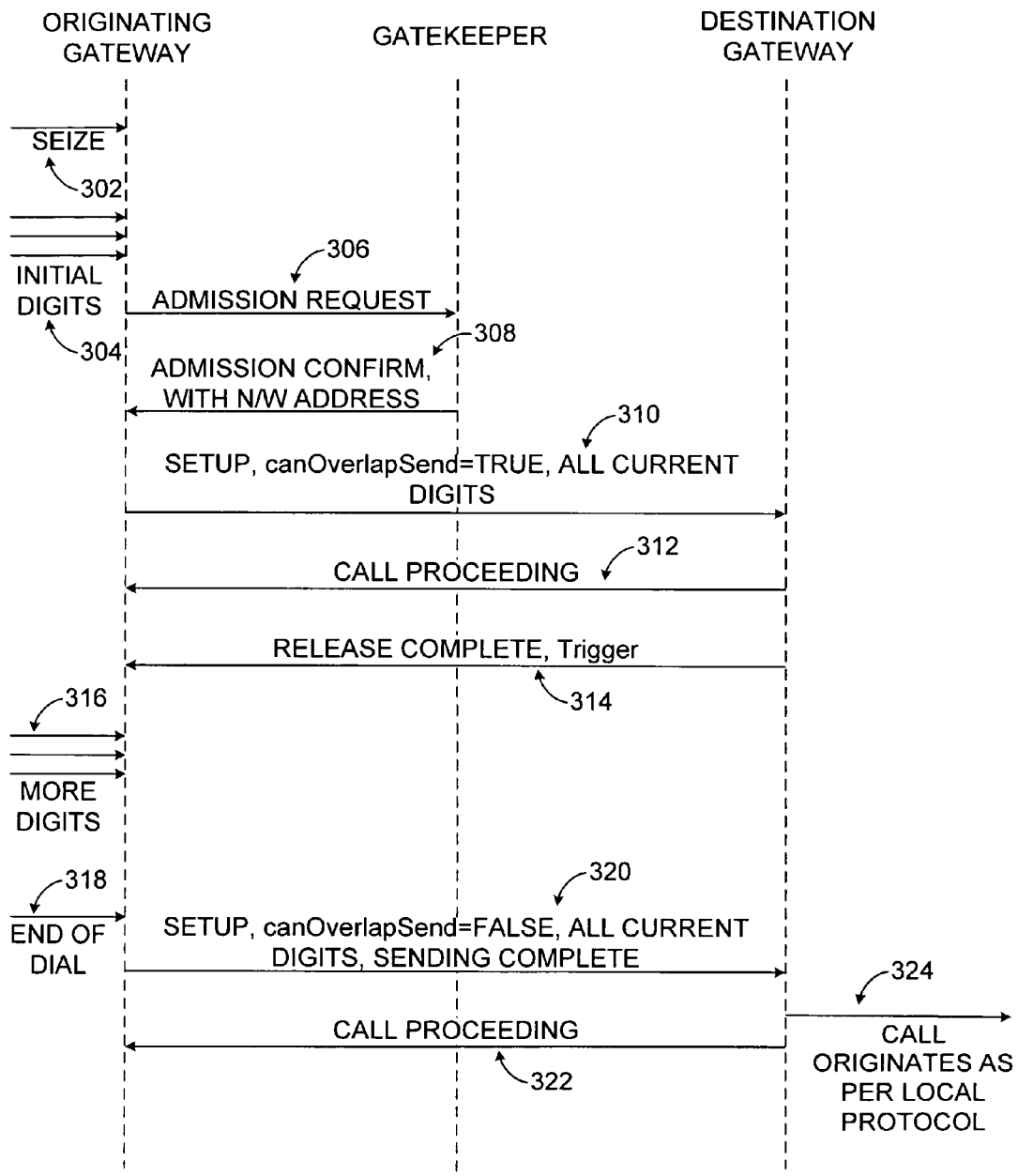
FIG. 3 illustrates example signaling messages for switching from overlap signaling to en bloc signaling according to one embodiment of this disclosure.

FIG. 3 illustrates example signaling messages for switching from overlap signaling to en bloc signaling according to one embodiment of this disclosure. In particular, FIG. 3 illustrates how signaling messages supported in the H.323 protocol may be used to switch from overlap signaling to en bloc signaling in the example mentioned above (involving the originating gateway 104a and the destination gateway 104b of FIG. 1). The signaling messages shown in FIG. 3 could be used in the system 200 of FIG. 2 or in any other suitable system.

As shown in FIG. 3, the originating gateway 104a receives a signal 302 indicating that the calling party has activated the communication device 102a. For example, the signal 302 may indicate that the calling party has lifted a handset from a cradle of the communication device 102*a*, placing the device 102*a* in an "off hook" condition and seizing the line from the communication device 102*a* to the gateway 104*a*. In other embodiments, a trunk seizure, an ISDN SETUP without a called party destination (digits), a DPNSS1 Initial Services Request Message (ISRM), or other signal may be used.

The originating gateway 104*a* also receives one or more initial digits 304 from the calling party. The initial digits 304 represent the minimum number of digits required before a call attempt can be made using overlap signaling. The initial digits 304 could be received in any suitable manner, such as when the gateway 104*a* detects DTMF signals from the communication device 102*a*. Although described here as digits, the destination address could be represented by any suitable string of alpha-numeric data, such as a string that is entered sequentially by the calling party.

The originating gateway 104*a* then begins its attempt to establish the requested communication session with a destination. Once the minimum number of digits needed to make an initial call attempt using overlap signaling is received, the originating gateway 104*a* attempts initial address resolution. In this example, the originating gateway 104*a* sends a request message 306 (such as an H.323 admission request or "ARQ" message) to the gatekeeper 126 with the received digits. If the gatekeeper 126 can resolve the destination address, the gatekeeper 126 responds with a confirmation message 308 (such as an admission confirmation message), which includes the network address (such as the IP address) of the destination gateway 104*b*. If the gatekeeper 126 cannot resolve the destination address, the gatekeeper 126 could return a failure indication to the originating gateway 104*a*. In the event of a non-fatal failure indication (such as an admission reject or "ARJ" with the rejectReason set to incompleteAddress), the originating gateway 104*a* may wait for more data and send another request message 306 to the gatekeeper 126. In other embodiments, the originating gateway 104*a* may use a local addressing table to identify the network address of the correct destination gateway 104*b*, and the messages 306-308 are not used.

In response to the confirmation message 308, the originating gateway 104*a* transmits a call setup message 310 (such as an H.225.0 SETUP message) to the destination gateway 104*b*. The call setup message 310 includes, among other things, a portion (but not all) of the destination address. In some embodiments, this message 310 includes a parameter "canOverlapSend" Boolean flag set to TRUE in the "User to User" IE of the message 310. This indicates that the originating gateway 104*a* is attempting to use overlap signaling to establish the call. In particular embodiments, the message 310 could use either a standardized indication or a user-specified indication that a call attempt is being made with overlap signaling. If both indications could be present in a message 310, a default one (such as the standardized indication) could be selected for use in the system 100. The destination gateway 104*b* may respond to the message 310 with an acknowledgement of the call setup message 310, such as a call proceeding message 312. The destination gateway 104*b* may also generate a trigger immediately if it detects the need to generate the trigger.

The destination gateway 104*b* determines that overlap signaling cannot be used to provide the requested service. In this case, the destination gateway 104*b* responds by rejecting the call because of an invalid or incomplete telephone number. For example, the destination gateway 104*b* may determine that the originating gateway 104*a* supports both overlap signaling and en bloc signaling but that the destination gateway 104*b* only supports en bloc signaling. The destination gateway 104*b* therefore responds with a release message 314 (such as an H.225.0 RELEASE COMPLETE message) including a trigger. As another example, a communication device access interface between the destination communication device 102*b* and the destination gateway 104*b* could determine that the attempted call has failed, and the destination gateway 104*b* responds with the message 314. As described below, the message 314 could include a trigger that causes the originating gateway 104*a* to switch over and attempt to establish the call using en bloc signaling. In some embodiments, the destination gateway 104*b* transmits a message that contains a trigger (i) in all cases, (ii) in all cases where overlap to en bloc conversion may be beneficial, (iii) when the destination gateway 104*b* knows that the originating gateway 104*a* supports overlap to en bloc conversion, (iv) when the destination gateway 104*b* knows or is unsure that the originating gateway 104*a* supports overlap to en bloc conversion, or (v) in any other suitable manner. Also, in some embodiments, if the destination gateway 104*b* supports any form of call redirection for vacant numbers, supports overlap signaling or en bloc signaling based on provisioning, is provisioned as en bloc, and can identify overlap requests, the destination gateway 104*b* may transmit the message 314 with inclusion of the trigger to the originating gateway 104*a* to invoke the switch-over before the call redirection is performed.

The originating gateway 104*a* receives the message 314 and detects the trigger, which invokes the switch-over to en bloc signaling. The vestiges of the attempted call are released on the packet network side of the gateway 104*a*, while the call on the user side of the gateway 104*a* remains in the active state. In some embodiments, the originating gateway 104*a* handles the call on the user side as though the call was in an overlap dialing sub-state. The originating gateway 104*a* initiates the switch-over from overlap signaling to en bloc signaling in response to one or more triggers. The triggers could vary depending on, for example, the signaling protocol used in the system 100. As an example, if the H.323 protocol or the Q.2931 protocol is used, the message 314 from the destination gateway 104*b* may include a cause code of 1 (unassigned number) or 28 (invalid number format/incomplete address). Either cause code could act as a trigger to initiate the switch-over from overlap signaling to en bloc signaling. As another example, if the SIP protocol is used, a call clearing message 404 (not found) or a call clearing message 484 (incomplete number) could be used to initiate the switch-over. This trigger created from protocol elements within the protocol standard may be further enhanced by additional messaging data or other message contents to resolve any ambiguities.

At this point, the gateway 104*a* collects additional digits 316 of the called party's telephone number from the calling party. The collection of additional digits 316 ends in response to an "end of dial" signal 318. The end of dial signal 318 may indicate that an end of dial event has occurred. The end of dial event could represent receipt of a value such as the DTMF octothorpe ("#"), receipt of an ISDN Sending Complete IE, expiration of an end of dial timer, or other event. While shown as being received by the originating gateway 104*a*, the end of dial signal 318 could be generated internally in the gateway 104*a*.

Following the end of dial event, the originating gateway 104*a* generates another call setup message 320 (such as an H.225.0 SETUP message), and this message 320 includes an explicit or implicit end of dial indication. For example, the end of dial indication could take the form of the ITU-T Sending Complete IE, which may also be accompanied by the "User to User" IE having the "canOverlapSend" Boolean flag set to FALSE. In this example, the message 320 contains all of the required addressing information, so this represents a call attempt being made using en bloc signaling. The presence of the end of dial indication in the received message indicates that no further digits will be received by the destination gateway 104b.

The destination gateway 104b receives the message 320 and responds with a call proceeding message 322. The destination gateway 104b also provides one or more additional messages 324 to establish a voice connection with the called party using en bloc signaling.

This has illustrated the use of H.323 messages. The contents of the messages as defined within the H.323 protocol may be sufficient such that a combination of the standardized data elements can be used to provide the trigger. The H.323 protocol also permits easy expansion, using data elements with standardized forms, for carrying information in a format not standardized by the protocol. This may give the H.323 protocol flexibility to implement the switching from overlap to en bloc signaling. However, other protocols (such as SIP, Q.2931, and others) may have similar signaling capabilities to accomplish the same tasks shown in FIG. 3 or have the ability to add additional information as a trigger. As a result, any other protocol(s) supporting other or additional messages and message types could be used. For example, the call setup messages 310, 320 could be replaced by SIP INVITE messages that carry identifiers for the call, addressing information, and other indicators. Although SIP may not contain a direct equivalent to the Sending Complete IE and the "canOverlapSend" Boolean flag, SIP supports the use of the "#" digit, which is equivalent to the Sending Complete IE when it appears at the end of a dialed address. Also, the release message 314 could be replaced by SIP call clearing messages whose message type contains a reason why a call is cleared, which is analogous to the cause code in the message 314. Other protocols, including MGCP and Q.2931, could also be used.

Figure 4:
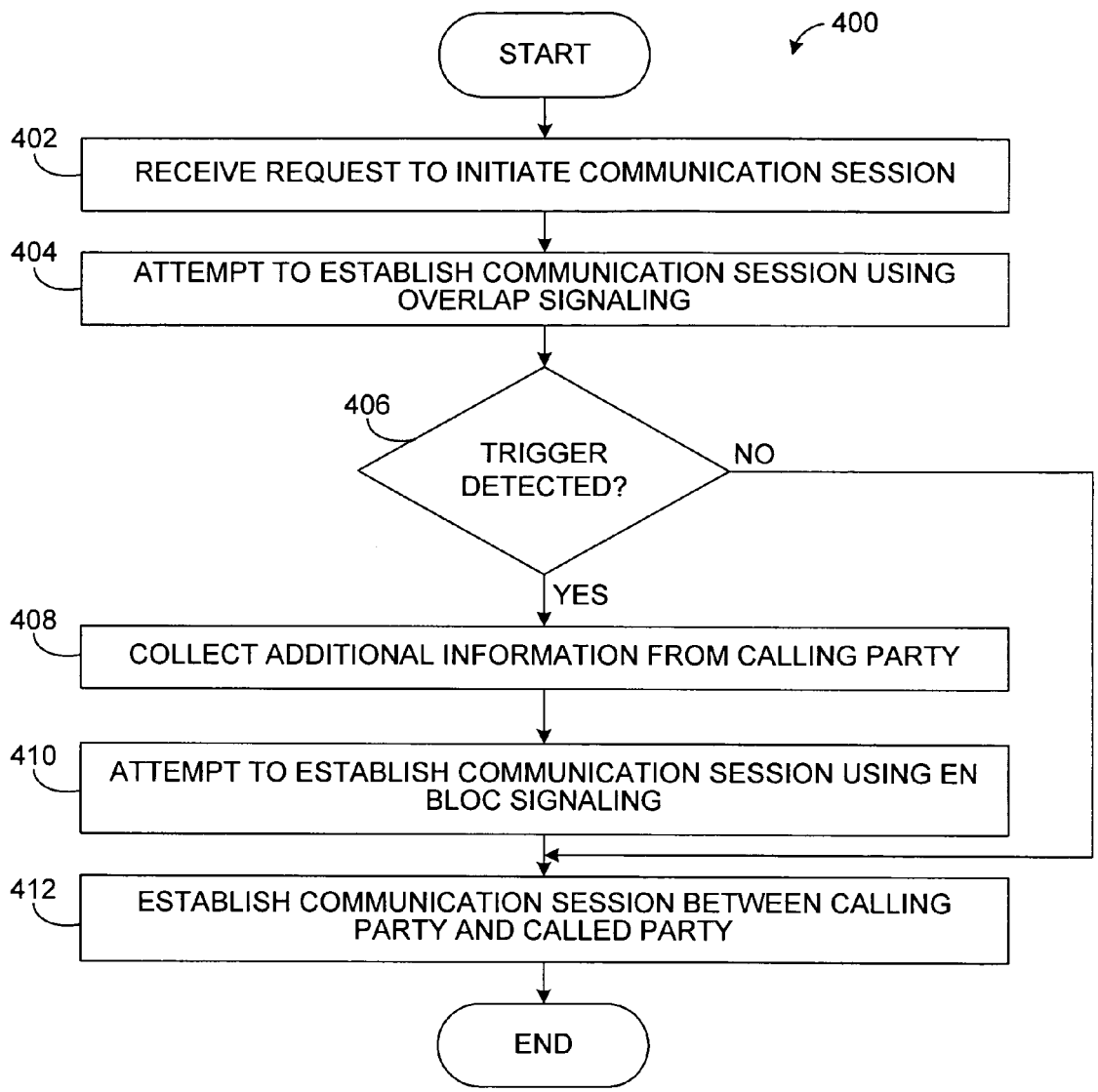
FIG. 4 illustrates an example method for switching from overlap signaling to en bloc signaling at an originating gateway according to one embodiment of this disclosure.

FIG. 4 illustrates an example method 400 for switching from overlap signaling to en bloc signaling at an originating gateway according to one embodiment of this disclosure. For ease of explanation, the method 400 is described with respect to the originating gateway 104a of FIG. 1 operating as described in the example mentioned above. The method 400 could be used in any other suitable device and in any other suitable system.

The originating gateway 104a receives a request to initiate a communication session at step 402. This may include, for example, the originating gateway 104a detecting that a calling party has begun using a communication device 102a and has started dialing a telephone number for a destination.

The originating gateway 104a attempts to establish the communication session using overlap signaling at step 404. This may include, for example, the originating gateway 104a communicating a call setup message to a destination gateway 104b before the originating gateway 104a has received all of the digits of the destination's address.

The originating gateway 104a determines if a trigger is detected at step 406. The originating gateway 104a utilizes a trigger to initiate a switch-over from overlap signaling to en bloc signaling. This may include, for example, the originating gateway 104a determining if it has received a message from the destination gateway 104b containing a code or parameter (such as a formatted data parameter) indicating that overlap signaling cannot be used.

If no trigger is detected at step 406, the originating gateway 104a establishes the communication session between the calling party and a called party if the called party answers the call at step 412. This may include, for example, the originating gateway 104a collecting additional digits of the destination from the calling party and sending additional call setup related messages (such as the H.323 INFORMATION message) to the destination gateway 104b prior to the called party answering. In this example, the continuation of overlap signaling takes place because the absence of the trigger (and presence of appropriate protocol messaging) indicates that the destination supports overlap signaling.

If a trigger is detected at step 406, the originating gateway 104a switches over and attempts to establish the communication session using en bloc signaling. The originating gateway 104a collects additional information from the calling party at step 408. This may include, for example, the originating gateway 104a receiving additional digits of the destination from the calling party. Although shown as occurring after steps 404-406, the originating gateway 104a could have received the additional information from the calling party at other times, such as during or in between step 402, step 404, or step 406 (like in between steps 404 and 406, which may be separated by tens or hundreds of milliseconds).

Once an end of dial event is detected, the originating gateway 104a attempts to establish the communication session using en bloc signaling at step 410. This may include, for example, the originating gateway 104a generating a call setup message that contains all of the digits of the destination address provided by the calling party. If the called party answers the call, the originating gateway 104a establishes the communication session at step 412.

Figure 5:
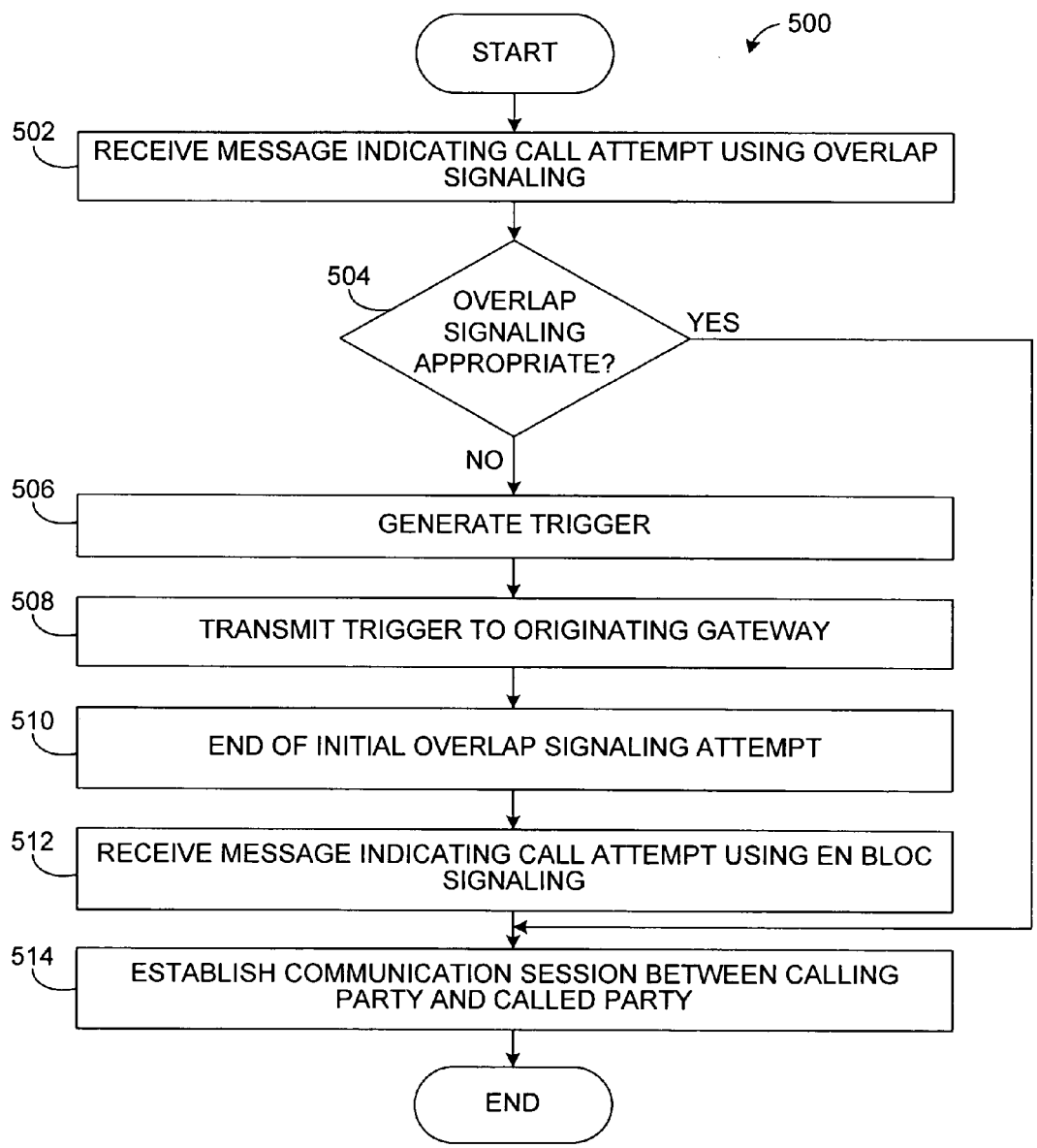
FIG. 5 illustrates an example method for switching from overlap signaling to en bloc signaling at a destination gateway according to one embodiment of this disclosure.

FIG. 5 illustrates an example method 500 for switching from overlap signaling to en bloc signaling at a destination gateway according to one embodiment of this disclosure. For ease of explanation, the method 500 is described with respect to the destination gateway 104b of FIG. 1 operating as described in the example mentioned above. The method 500 could be used in any other suitable device and in any other suitable system.

The destination gateway 104b receives a message indicating that a call attempt is being made using overlap signaling at step 502. This may include, for example, the destination gateway 104b receiving a call setup message explicitly or implicitly indicating that overlap signaling is being used.

The destination gateway 104b determines whether overlap signaling is appropriate at step 504. This may include, for example, the destination gateway 104b determining whether it is capable of and provisioned for overlapping signaling. This may also include the destination gateway 104b determining whether it is provisioned for only en bloc signaling. For cases where the communication device 102b is a discrete entity, this may also include making the "overlap versus en bloc" determination at both the packet network side and the user side of the destination gateway 104b. If overlap signaling is appropriate, the destination gateway 104b operates to establish a communication session between the calling party and the called party at step 512.

Otherwise, if overlap signaling is not appropriate, the destination gateway 104b generates a trigger at step 506. This may include, for example, the destination gateway 104b generating an H.323 message containing a certain cause code or generating a particular SIP call clearing message. The destination gateway 104b transmits the generated trigger to the originating gateway 104a at step 508. At this point, all remnant vestiges of the original call attempt may be cleared.

The initial attempt to establish the communication session using overlap signaling ends at step 510. If the originating gateway 104a switches over to en bloc signaling, the destination gateway 104b receives a message indicating that a call attempt is being made using en bloc signaling at step 512. Using the information contained in this message, the destination gateway 104b operates to establish a communication session between the calling party and the called party at step 514.

While shown as a single method in FIG. 5, the method 500 could be divided into two methods (steps 502-510 and steps 512-514). FIG. 5 assumes that the originating gateway 104a will attempt to establish the communication session using en bloc signaling after the use of overlap signaling fails. However, the destination gateway 104b may not assume that this will occur, so the method 500 could terminate after step 510. If and when the origination gateway 104a attempts to establish the communication session using en bloc signaling, the destination gateway 104b may then perform steps 512-514.

Although FIGS. 1 through 5 illustrate various systems, message flows, and methods for switching from overlap signaling to en bloc signaling, various changes may be made to FIGS. 1 through 5. For example, the systems in FIGS. 1 and 2 could include any number of communication devices, gateways, and networks, and each gateway could be coupled to any number of communication devices. Also, the functional division of the gateways shown in FIGS. 1 and 2 is for illustration only. Various components in the gateways could be combined, further subdivided, or omitted and additional components could be added according to particular needs. Further, the messages shown in FIG. 3 represent signaling messages supported by a particular protocol. Message flows supported by other protocols could be used to switch from overlap signaling to en bloc signaling, and the timing of the signals (such as the receipt of the additional digits 316) may vary. Beyond that, although shown as a series of steps in FIGS. 4 and 5, various steps in FIGS. 4 and 5 could occur in parallel. In addition, FIGS. 1 through 5 have illustrated that gateways may switch from overlap signaling to en bloc signaling. Gateways may "switch" from one signaling mechanism to another in any suitable manner. As examples, a gateway could stop using one signaling mechanism and begin using another, revert from one signaling mechanism to another, or convert messages between protocols.

In some embodiments, the functions of the gateways 104a-104b, 204a-204b are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   transmitting, from a gateway comprising a processor, a first message for establishing a communication session over a network using overlap signaling, the first message comprising only a portion of a destination address;
   detecting a trigger indicating that overlap signaling cannot be used to establish the communication session;
   collecting an additional portion of the destination address; and
   in response to detecting the trigger, transmitting, from the gateway, a second message for establishing the communication session over the network using en bloc signaling, the second message comprising an entire destination address.

2. The method of claim 1, wherein detecting the trigger comprises at least one of:
   detecting a message comprising a code or parameter indicating that overlap signaling cannot be used to establish the communication session; and
   detecting a type of message indicating that overlap signaling cannot be used to establish the communication session.

3. The method of claim 2, wherein:
   the message comprising the code or parameter comprises a message comprising a cause code having at least one specified value; and
   the type of message comprises at least one specified type of call clearing message.

4. The method of claim 1, wherein:
   the first message for establishing the communication session comprises an indication that overlap signaling is being used; and
   the second message for establishing the communication session comprises an indication that overlap signaling is not being used and an end of dial indication.

5. The method of claim 1, wherein:
   the communication session comprises a telephone call;
   the destination address comprises a telephone number;
   the portion of the destination address comprises some but not all digits of the telephone number; and
   collecting the additional portion of the destination address comprises collecting one or more additional digits of the telephone number.

6. The method of claim 1, wherein:
   a first gateway performs the transmitting steps, the detecting step, and the collecting step; and
   a second gateway provides the trigger over a packet network, wherein the second gateway is at least one of:
      unable to use overlap signaling over the packet network to establish the communication session; and
      unable to use overlap signaling with a communication device at the destination address to establish the communication session.

7. The method of claim 1, wherein collecting the additional portion of the destination address comprises collecting the additional portion of the destination address without requiring a user to reenter the portion of the destination address contained in the first message.

8. The method of claim 1, further comprising establishing the communication session using en bloc signaling.

9. An apparatus, comprising:
an interface for communicating with a communication device that requests establishment of a communication session; and
a signaling server for:
transmitting a first message for establishing the communication session using overlap signaling, the first message comprising only a portion of a destination address;
detecting a trigger indicating that overlap signaling cannot be used to establish the communication session;
collecting an additional portion of the destination address from the communication device; and
in response to detecting the trigger, transmitting a second message for establishing the communication session using en bloc signaling, the second message comprising an entire destination address.

10. The apparatus of claim 9, wherein the signaling server detects the trigger by at least one of:
detecting a message comprising a code or parameter indicating that overlap signaling cannot be used to establish the communication session; and
detecting a type of message indicating that overlap signaling cannot be used to establish the communication session.

11. The apparatus of claim 9, wherein:
the first message for establishing the communication session comprises an indication that overlap signaling is being used; and
the second message for establishing the communication session comprises an indication that overlap signaling is not being used and an end of dial indication.

12. The apparatus of claim 9, wherein:
the communication session comprises a telephone call;
the destination address comprises a telephone number;
the portion of the destination address comprises some but not all digits of the telephone number; and
the signaling server collects the additional portion of the destination address by collecting one or more additional digits of the telephone number.

13. The apparatus of claim 9, wherein a second apparatus provides the trigger over a packet network, and wherein the second apparatus is at least one of:
unable to use overlap signaling over the packet network to establish the communication session; and
unable to use overlap signaling with a second communication device at the destination address to establish the communication session.

14. The apparatus of claim 9, wherein the signaling server comprises:
a call controller for establishing the communication session using overlap signaling or en bloc signaling;
a second interface for communicating the first and second messages over a packet network; and
a third interface for communicating with the interface to the communication device through a call server.

15. The apparatus of claim 9, wherein the signaling server collects the additional portion of the destination address without requiring a user of the communication device to reenter the portion of the destination address contained in the first message.

16. A computer readable medium storing computer readable program code that can be executed by a computer for:
transmitting, from a gateway, a first message for establishing a communication session using overlap signaling, the first message comprising only a portion of a destination address;
detecting a trigger indicating that overlap signaling cannot be used to establish the communication session;
collecting an additional portion of the destination address; and
in response to detecting the trigger, transmitting, from the gateway, a second message for establishing the communication session using en bloc signaling, the second message comprising an entire destination address.

17. The computer readable medium of claim 16, wherein the computer readable program code that can be executed by a computer for detecting the trigger comprises at least one of:
computer readable program code for detecting a message comprising a code or parameter indicating that overlap signaling cannot be used to establish the communication session; and
computer readable program code for detecting a type of message indicating that overlap signaling cannot be used to establish the communication session.

18. The computer readable medium of claim 16, wherein:
the first message for establishing the communication session comprises an indication that overlap signaling is being used; and
the second message for establishing the communication session comprises an indication that overlap signaling is not being used and an end of dial indication.

19. The computer readable medium of claim 16, wherein the computer readable program code that can be executed by a computer for collecting the additional portion of the destination address does not require a user to reenter the portion of the destination address contained in the first message.

20. The computer readable medium of claim 16, wherein:
the communication session comprises a telephone call;
the destination address comprises a telephone number;
the portion of the destination address comprises some but not all digits of the telephone number; and
the computer readable program code for collecting the additional portion of the destination address comprises computer readable program code for collecting one or more additional digits of the telephone number.

* * * * *